US010970047B2

(12) United States Patent
Evans et al.

(10) Patent No.: US 10,970,047 B2
(45) Date of Patent: *Apr. 6, 2021

(54) LOSSLESS BI-DIRECTIONAL FORMATTING OF PROGRAM SOURCE CODE

(71) Applicant: International Business Machines Corporation, Armonk, NY (US)

(72) Inventors: Dominic Evans, Hampshire (GB); Ledina Hido-Evans, Winchester (GB); Adrian J. Preston, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,665

(22) Filed: Jun. 28, 2019

(65) Prior Publication Data
US 2019/0324728 A1 Oct. 24, 2019

Related U.S. Application Data
(63) Continuation of application No. 15/592,560, filed on May 11, 2017, now Pat. No. 10,372,424.

(51) Int. Cl.
*G06F 8/33* (2018.01)
*G06F 8/71* (2018.01)

(52) U.S. Cl.
CPC . *G06F 8/33* (2013.01); *G06F 8/71* (2013.01)

(58) Field of Classification Search
CPC ........................................................ G06F 8/33
USPC ........................................................ 717/113
See application file for complete search history.

(56) References Cited

U.S. PATENT DOCUMENTS

| 7,325,191 B2 | 1/2008 | Goddard et al. |
| 8,312,440 B2 | 11/2012 | Iwama et al. |
| 9,703,547 B2 * | 7/2017 | Dhoolia ................ G06F 8/70 |
| 2003/0233621 A1 | 12/2003 | Paolini et al. |

(Continued)

FOREIGN PATENT DOCUMENTS

WO    WO2008110411    9/2008

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — John Q Chavis
(74) *Attorney, Agent, or Firm* — Heslin Rothenberg Farley & Mesiti P.C.; William A. Kinnaman, Esq.

(57) ABSTRACT

A method, computer program product, and system includes a processor(s) of a host obtaining, from a client, via a communication connection over a network, a request to commit a modified version of program source code to a repository administered by the host. The processor(s) identify formatting in the modified version implemented by an editor executing on the client and remove the formatting. The processor(s) transform the modified version into a first storage structure that includes content of the modified version without the identified formatting. The processor(s) identify one or more differences between the first storage structure representing the modified version and a second storage structure (an unmodified version of the program source code stored in the repository). The processor(s) store the one or more differences in the repository.

20 Claims, 7 Drawing Sheets

(56) References Cited

U.S. PATENT DOCUMENTS

| | | |
|---|---|---|
| 2004/0122791 A1 | 6/2004 | Sea et al. |
| 2007/0011654 A1 | 1/2007 | Opperman |
| 2008/0229290 A1* | 9/2008 | Jones ........................ G06F 8/33 717/137 |
| 2013/0055227 A1* | 2/2013 | Zachariah ................. G06F 8/51 717/168 |
| 2013/0339922 A1* | 12/2013 | Sproule ................ G06Q 10/063 717/103 |
| 2015/0142737 A1* | 5/2015 | Behuria ................ G06F 16/273 707/613 |
| 2018/0329688 A1 | 11/2018 | Evans et al. |

OTHER PUBLICATIONS

Automatic Source Code Formatting—GROMACS 2016.1 documentation: http://manual.gromacs.org/documentation/2016/dev-manual/funcrustify.html. 5 pages.

Guidelines for Code Formatting—GROMACS 2016.1 documentation: http://manual.gromacs.org/documentation/2016/dev-manual/formatting.html. 1 page.

List of IBM Patents or Patent Applications Treated as Related dated Jul. 10, 2019, 2 pages.

* cited by examiner

PRIOR ART

LOSSLESS BI-DIRECTIONAL FORMATTING OF PROGRAM SOURCE CODE

BACKGROUND

The invention relates to bi-directional formatting of program source code for development, debugging and executing in computing environments. The perceived proper style and formatting of program source code is a subject of debate among software developers. Traditionally the intention of laying code out in a particular style has been to maximize readability, allowing the logic, content, and progression of the code to be quickly understood by a developer reviewing the text. Unfortunately, what constitutes readability can be a subjective measure. Inconsistencies in formatting, as implemented in accordance with various developers collaborating on one or more programs, potentially mask the discovery of real logic problems in the code.

SUMMARY

Shortcomings of the prior art are overcome and additional advantages are provided through the provision of a method for implementing bi-directional source code format control. The method includes, for instance: obtaining, by one or more processors of a host, from a client, via a communication connection over a network, a request to commit a modified version of program source code to a repository administered by the host; identifying, by the one or more processors, formatting in the modified version implemented by an editor executing on the client; removing, by the one or more processors, the identified formatting from the modified version; transforming, by the one or more processors, the modified version into a first storage structure comprising content of the modified version without the identified formatting; identifying, by the one or more processors, one or more differences between the first storage structure representing the modified version and a second storage structure, wherein the second storage structure comprises an unmodified version of the program source code stored in the repository; and storing, by the one or more processors, the one or more differences in the repository.

Shortcomings of the prior art are overcome and additional advantages are provided through the provision of a computer program product for implementing bi-directional source code format control. The computer program product comprises a storage medium readable by a processing circuit and storing instructions for execution by the processing circuit for performing a method. The method includes, for instance: obtaining, by the one or more processors of a host, from a client, via a communication connection over a network, a request to commit a modified version of program source code to a repository administered by the host; identifying, by the one or more processors, formatting in the modified version implemented by an editor executing on the client; removing, by the one or more processors, the identified formatting from the modified version; transforming, by the one or more processors, the modified version into a first storage structure comprising content of the modified version without the identified formatting; identifying, by the one or more processors, one or more differences between the first storage structure representing the modified version and a second storage structure, wherein the second storage structure comprises an unmodified version of the program source code stored in the repository; and storing, by the one or more processors, the one or more differences in the repository.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
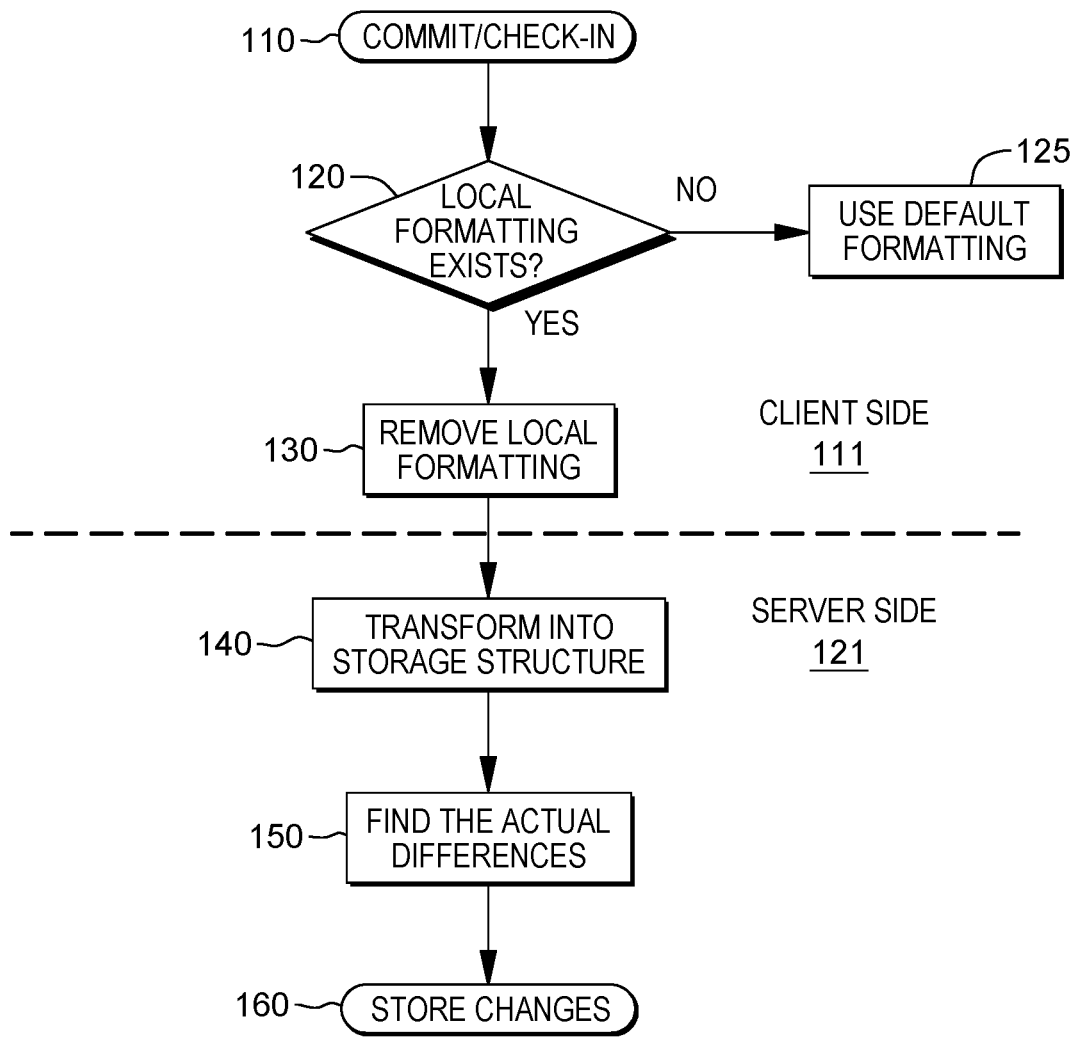
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
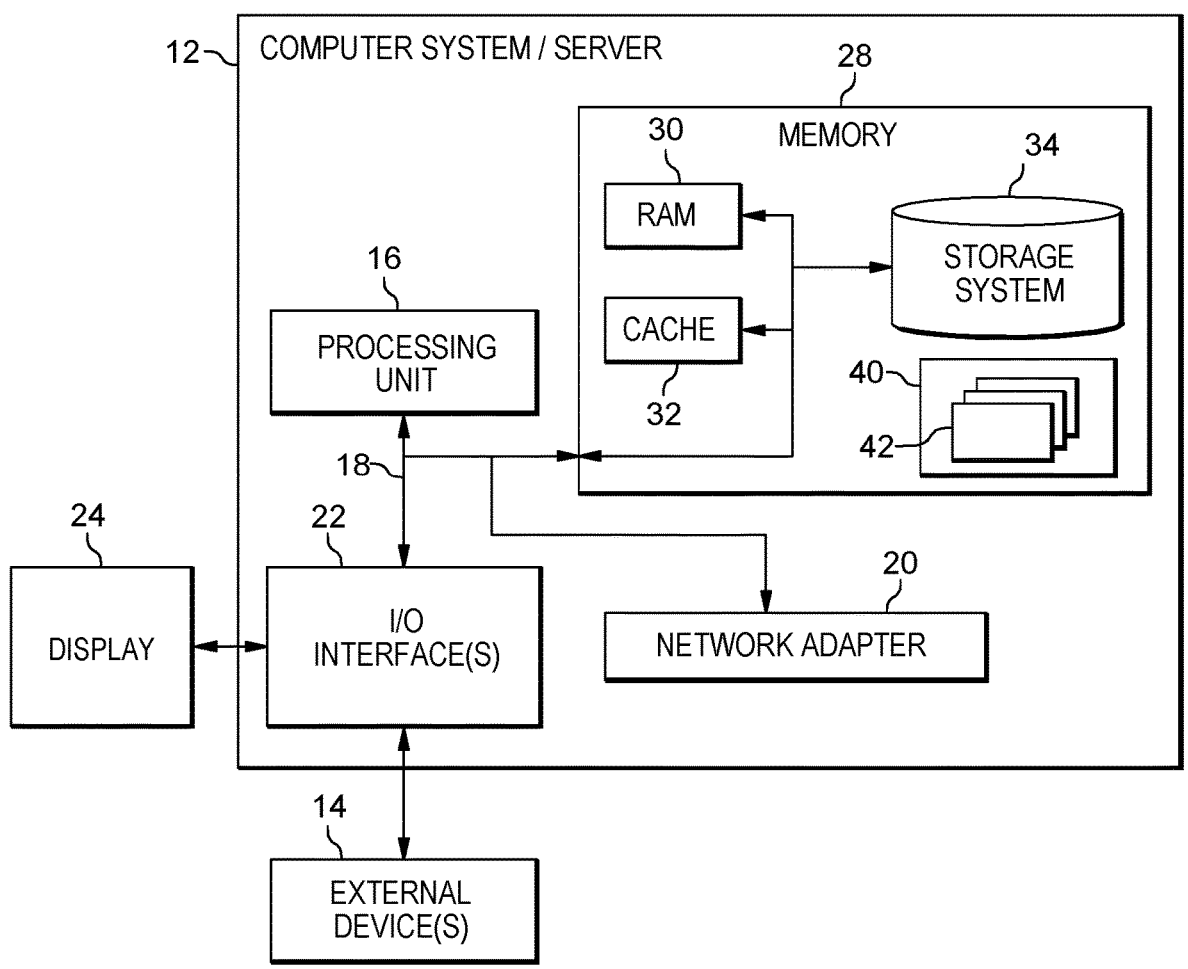
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

In embodiments of the present invention, a computer-implemented method, a computer program product, and a computer system include program code that provides lossless bi-directional formatting of program source code. Embodiments of the present invention provide advantages over existing source code formatting techniques at least because in these embodiments, one or more programs executing on at least one processing circuit provide bi-directional translation, at the server side, on the program source code, automatically, i.e., without user intervention.

Utilizing an embodiment of the present invention, a software developer working on a client in an editor can set up individual editor and formatter settings, and despite this customization, the one or more programs automatically format the source code to a standard style on source extract. When a developer working on the client checks in changes, the one or more programs translate the program source code back to a structure supported by the server, to compare the updated code to the previous version in the repository, and to calculate the real changes made.

Advantages of some embodiments of the present invention over existing source code formatting systems, include, but are not limited to: 1) embodiments of the present invention enable individual developers to interact with source code in an editor using customized visual settings; 2) embodiments of the present invention avoid the need for developers working jointing to agree on a coding standard up-front, which can be a prolonged and inefficient negotiation; 3) embodiments of the present invention similarly avoid the need for any agreement between developers regarding the styling and the formatting of the source code at code review; and 4) embodiments of the present invention eliminate the need for an individual to have to use different styles for different projects/teams that this individual works on concurrently, in which the standardization of the program code may vary.

Aspects of the present invention address inefficiencies in code development by implementing server-side commercial source control of software. The automatic bi-directional formatting of source code in embodiments of the present invention is inextricably tied to computing because these one or more programs, which execute on at least one processor (of one or more servers) in a multi-user computing environment, address development and version control inefficiencies. Certain aspects of embodiments of the present invention can be integrated with existing solutions to provide enterprise systems with the added functionality described herein. For example, aspects of certain embodiments of the present invention can be integrated into existing commercial source control software, including but not limited to, IBM® Rational® Team Concert™, a proprietary Git (a version control system) extension for the Jazz Hub cloud hosted source control, a free offering (e.g., Eclipse), and/or other editor plugins that depend upon a proprietary backend. IBM® and Rational® are registered trademarks of International Business Machines Corporation, Armonk, N.Y., US. IBM® Rational® Team Concert™ is a software development team collaboration tool. Presently, IBM® Rational® Team Concert™ and Git integration can be utilized to manage process enforcement for Git source control operations and to associate work items with Git commits. Git is compatible with various operating systems and Integrated Development Environments (IDEs), and when integrated with aspects of embodiments of the present invention, Git can maintain this portability. However, aspects of various embodiments of the present invention can be integrated with source control systems, Git is one example that is offered here for illustrative purposes.

Aspects of various embodiments of the present invention improve productivity of a developer workforce because style, formatting and interpretation of source code is an everyday problem faced by collaborating developers and introduces inconsistencies and inefficiencies into the process, which are decreased, if not eliminated, though the implementation of aspects of embodiments of the present invention. Existing automatic formatting systems for source code force developers to adopt a common style, enforced by company-wide or project-specific standards. These systems prevent each individual from working in a style that this individual feels most comfortable with and the style that this individual is most productive when reading and writing source code utilizing. In contrast, in embodiments of the present invention, while a client program executing on a developer's computing node enables the developer to customize her or his editor (e.g., setting up editor and formatter settings), one or more programs of this client application automatically format the code on source extract. Thus, when the edits to the source made by the developer result in changes, to deliver these changes to a repository on or accessible to a server, the one or more programs translate the source code back to a structure supported by the server, compare the source to a previous version in the repository, and calculate the real changes made. Hence, in embodiments of the present invention, one or more programs provide bi-directional translation, server side, on program source code, without user intervention.

Embodiments of the present invention provide various advantages over existing automatic formatting systems for source code. For example, in embodiments of the present invention, one or more programs provide the aforementioned lossless bi-directional formatting and store the source code remotely, such that multiple developers can employ their own individual styles choices regardless of how the source code is stored. This one or more programs are compatible with any editor and are transparent, from the point of view of the user. In addition, in embodiments of the present invention, the one or more programs store the program source code with no format in a repository. The lossless quality of the automatic formatting in embodiments of the present invention is advantageous over client-side automatic formatting systems for source code, which are not lossless. In client-side systems, whitespace and formatting are re-applied atop a user's local changes, which can result in losses, but in embodiments of the present invention, the one or more programs losslessly strip these items server side.

FIG. 1 is a workflow that depicts aspects of some embodiments of the present invention. FIG. 1 depicts certain aspects that occur (or are experienced) on a client side 111 (e.g., on a computing device communicatively coupled to a server) and certain aspects that occur on a server side 121. As mentioned above, by handling certain aspects server side, as opposed to client-side, one or more programs in embodiments of the present invention provide lossless bi-directional formatting.

In some embodiments of the present invention, one or more programs executing on a processing resource on the server side 121, execute an editor client application (or provide an editor client application as a service) to a computing node on the client side 111. In another embodiment of the present invention, the one or more programs receive indications from an editor executing on the client-side to indicate actions taken by users of a client application, on a computing node remote, from the one or more server on the server side 121.

In some embodiments of the present invention, program code executing on a resource on the server side 121 in a multi-user computing environment, obtains an indication that a user of a program source code editor on the client side 111 has committed and/or checked in changes to the program source code (110). Upon obtaining this indication, the one or more programs determine if there is local formatting in the program source code (120). Local formatting refers to customizations made by the user while working with the program source code in the editor. For example, the user may have selected specific formatting to view when working on the program source code. As mentioned earlier, aspects of embodiments of the present invention, because they execute at the server side 121, can be utilized across editors and are transparent, from the point of view of the user. If there is no local formatting, the one or more programs identify any default formatting utilized in the editor to format the program source code (125). The one or more programs remove the formatting, whether custom or default, from the program source code (130). Once the formatting has been removed, on the server side 121, the one or more programs transform the program source code into a structure that will be stored in a code repository (140). The one or more programs utilize a last version (or last storage structure) of a relevant portion of the program source code to compare this last version to the transformed program source code and identify changes between the transformed program source code and the last version (150). The one or more programs store the changes in the repository with the storage structure (160).

Figure 2:
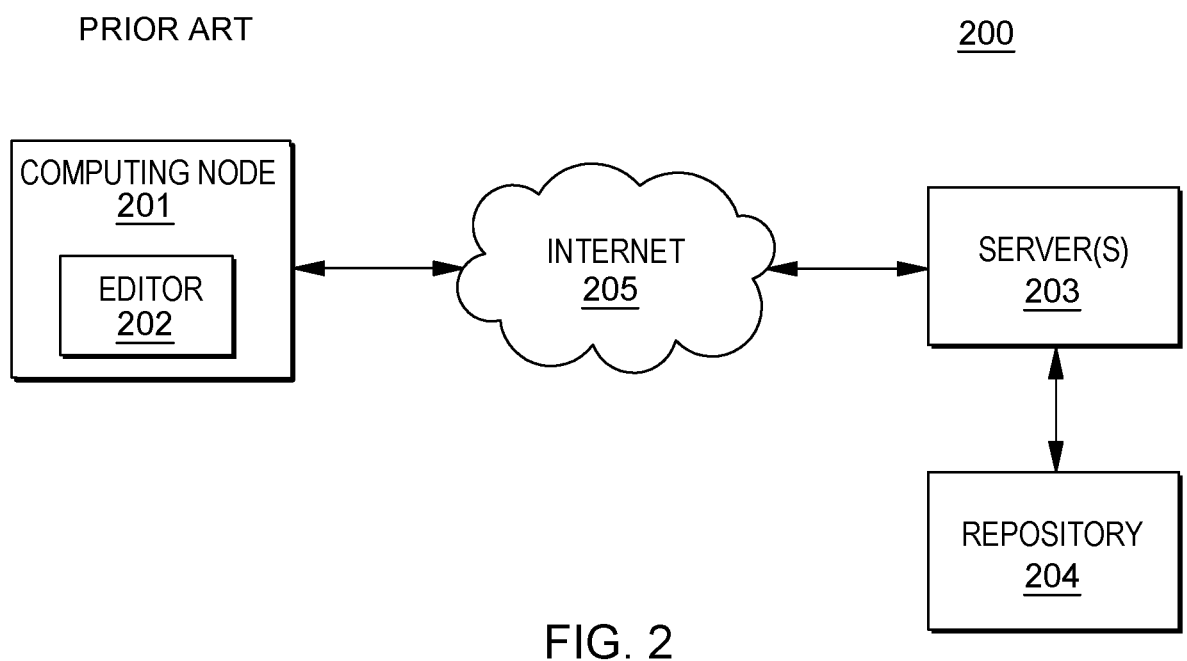
FIG. 2 is an illustration of a technical environment into which various aspects of an embodiment of the present invention may be implemented.

FIG. 2 is a technical environment 200 into which aspects of the present invention can be implemented. The technical environment includes a computing node 201 upon which an editing program (editor) 202 is accessible to a user/developer. The computing node 201 and the editing program 202 communicate with one or more servers 203 executing one or more programs executing aspects of the embodiments of the present invention. The computing node 201 and the server(s) 203 communicate over a network, including but not limited to, the Internet 205. The one or more servers 203 include and/or are communicatively coupled with a repository 204, utilized to store program source code and ensure version control and integrity.

Figure 3:
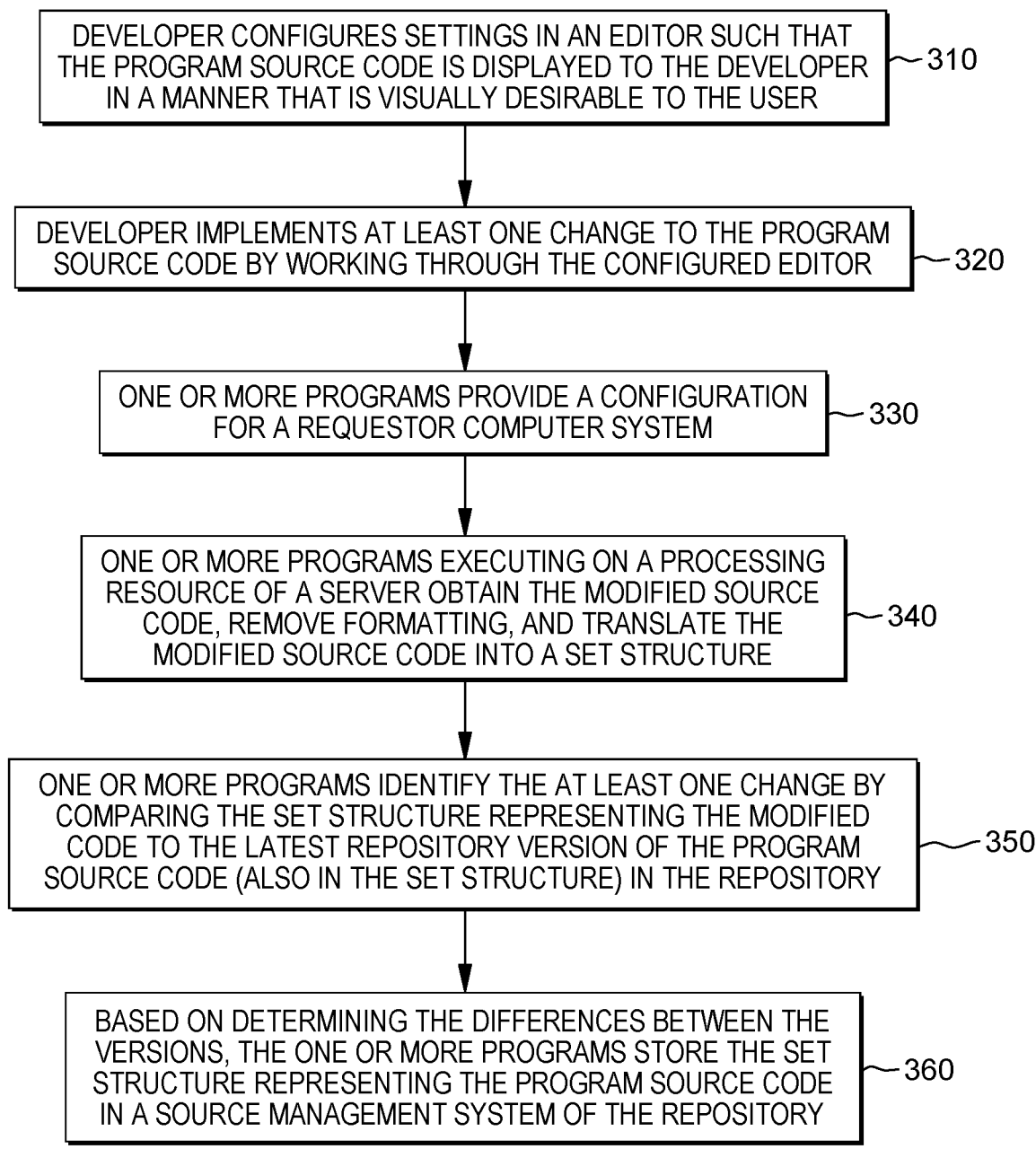
FIG. 3 is a workflow illustrating certain aspects of an embodiment of the present invention.

FIG. 3 is an expanded workflow 300 of certain aspects of embodiments of the present invention that further explains the interaction of a user with one or more programs in some embodiments of the present invention and the benefits to the user of the lossless bi-directional formatting of the program source code by the one or more programs. To aid in illustrating this workflow 300, references are made to the technical environment 200 of FIG. 2. These references are not meant to imply that this workflow 300 is limited to implementation in environments that resemble the technical environment 200 of FIG. 2, but are merely included for illustrative purposes.

As illustrated in the workflow 300, in embodiments of the present invention, a developer (user) configures settings in the editor 202 to create a visual of the program source code (e.g., structure, formatting, and style) in the graphical user interface of the computing node 201 such that the program source code is displayed to the developer in a manner that is visually desirable to the user (310). While editing the program source code in the editor 201, the developer implements at least one change to the program source code by working through the configured editor (320). The developer checks in or commits the modified program source code to a repository 204 (the modified program source code is the program source code that includes the at least one change) (330). During the editing, certain changes that are made by the developer to the code may be formatting rather than substantive changes. For example, a developer may insert whitespace into program source code.

One or more programs executing on a processing resource of a server 203 (or one or more server) obtain the modified program source code, remove formatting, and translate the modified program source code into a set structure representing the modified program source code (340). The set structure may vary across different implementations of aspects of embodiments of the present invention and may include, but is not limited to, a tree structure. The set structure may be selected based on attributes of the program source code, including but not limited to, the programming language utilized. For example, depending upon the programming language, the one or more programs may handle whitespace in the program source code differently. Whitespace is not significant in certain languages, including but not limited to Java, C, and most popular languages, with the exclusion of certain popular languages such as python and haskell. Thus, when whitespace is not significant, the one or more programs can store the program source code in a standardized and squashed binary format. For program source code in languages where indentation/whitespace is significant, the one or more programs would preserve this whitespace and would not include it in subsequent automatic reformatting (when checked out of a repository for further editing).

Some embodiments of the present invention may be implemented as language-specific tools to build canonical internal representations (e.g., an Abstract Syntax Tree), that allow the bi-directional mappings to occur. In these embodiments, for storage purposes, one or more programs could naturally serialize the AST into a minimized representation. Some embodiments of the present invention may utilize a lexer to perform lexical analysis (i.e., separating a stream of characters into different words or tokens).

In some embodiments of the present invention, when the one or more programs obtain the modified code and translate it into the set structure, the one or more programs determine whether to preserve references in the modified program source code in the set structure. For example, the one or more programs determine whether references, including but not limited to, line numbers in core dumps or trace files, are specific to the formatting of the source code when it was compiled on the build machine. If the one or more programs determine that the references should be preserved, in some embodiments of the present invention, the one or more programs can access mapping tables that were generated as part of the build to preserve the mappings between the line numbers and, for example, in the matching AST node. The one or more programs could update the entries in the tables to designate the locations of the references in the set structure. Thus, when the code is checked out for further editing, the editor could use this table to map the line number entries to their re-formatted locations.

The one or more programs identify the at least one change by comparing the set structure representing the modified program code to the latest version of the program source code (also in the set structure) in the repository 204 (350). As discussed above, the changes identified in this comparison are actual substantive changes to the source code, rather than stylistic changes that the individual developer implemented in order to view and edit the program source code more coherently in the editor 202.

Based on determining the differences between the versions, the one or more programs store the set structure representing the program source code in a source management system of the repository 204 (360). The one or more programs store the identified changes in the repository. In embodiments of the present invention, the formal contract being that the back-and-forth conversions is both lossless and reproducible.

Figure 4:
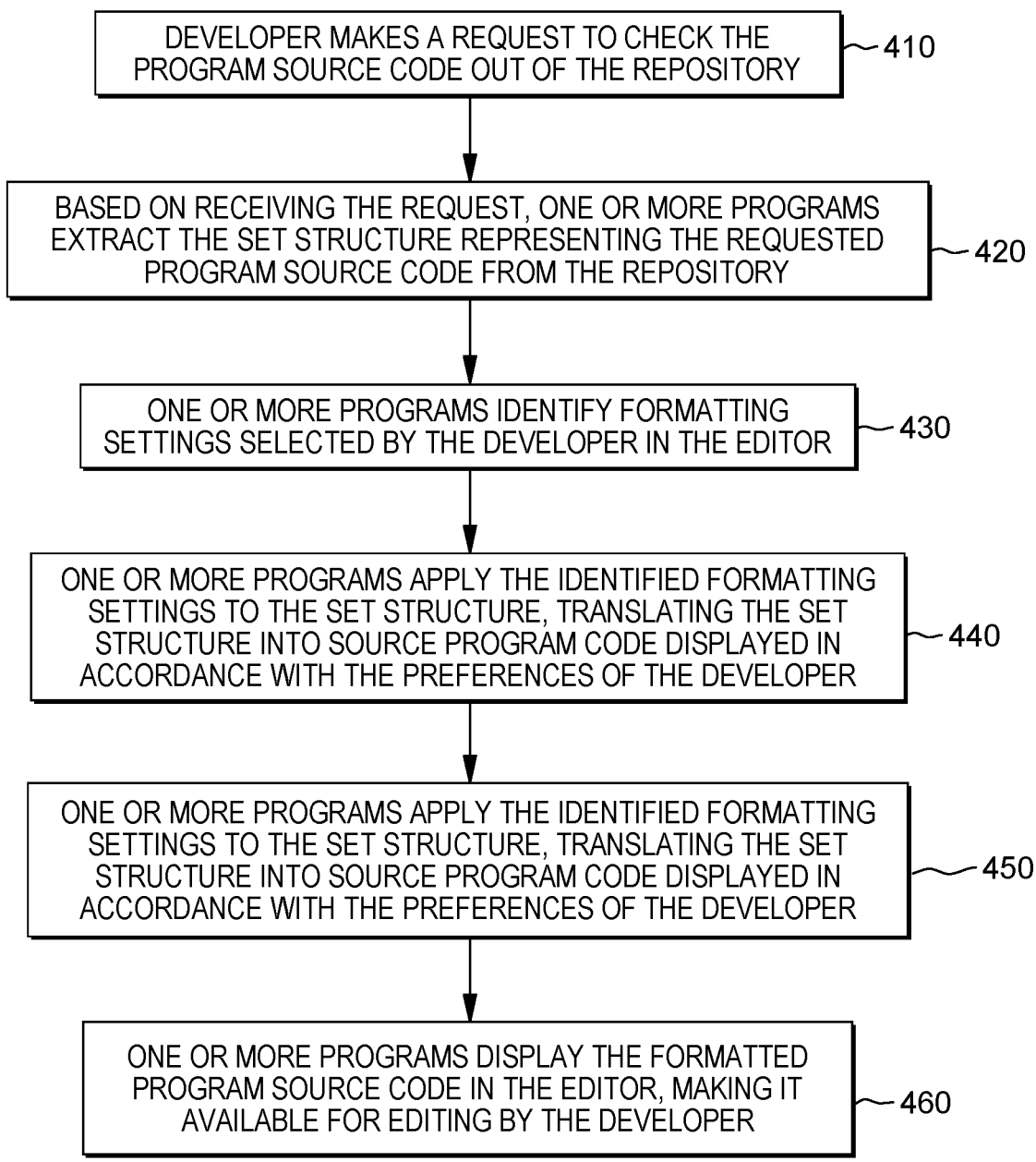
FIG. 4 is a workflow illustrating certain aspects of an embodiment of the present invention.

FIG. 4 is a workflow 400 if an embodiment of the present invention that also references the technical environment 200 of FIG. 2 for illustrative purposes. Referring to FIG. 4, in the event the developer desires to make additional changes to the modified source code, through the editor, the developer (user) makes a request to check the program source code out of the repository 204 (410). Based on receiving this request, the one or more programs extract the set structure representing the requested program source code from the repository 204 (420). The one or more programs identify formatting settings selected by the developer in the editor 202 (e.g., including custom and default settings) (430). The one or more programs apply the identified formatting settings to the set structure, translating the set structure into source program code displayed in accordance with the preferences of the developer (450). For example, if the one or more programs eliminated indentations in white space inserted by the developer when editing the program source code when storing the modified code in the repository, the one or more programs may insert these elements at this juncture. In an embodiment of the present invention, these settings may be default settings in the editor in addition to or rather than those selected manually by the developer. The one or more programs display the formatted program source code in the editor 202, making it available for editing by the user (460).

Embodiments of the present invention include a computer-implemented method, a computer program product, and a computer system where one or more programs, executing on one or more processors of a host, obtain, from a client, via a communication connection over a network, a request to commit a modified version of program source code to a repository administered by the host. The one or more programs identify formatting in the modified version implemented by an editor executing on the client. The one or more programs remove the identified formatting from the modified version. The one or more programs transform the modified version into a first storage structure comprising content of the modified version without the identified formatting. The one or more programs identify one or more differences between the first storage structure representing the modified version and a second storage structure, where the second storage structure comprises an unmodified version of the program source code stored in the repository. The one or more programs store the one or more differences in the repository.

In some embodiments of the present invention, the unmodified version of the program source code includes a last version of the program source code committed to the repository.

In some embodiments of the present invention, to identify the formatting, the one or more programs determine if the formatting in the modified version implemented by an editor executing on the client includes one of: custom formatting implemented by user entry in a graphical user interface of the editor or default formatting implemented automatically in the editor.

In an embodiments of the present invention, the one or more programs also obtain, from the client, via the communication connection over the network, a request to obtain a most recent version of the program source code from the repository. The one or more programs extract a set structure representing the most recent version from the repository, where the extracting comprises synthesizing the one or more differences in the repository and the second storage structure into the set structure representing the most recent version. The one or more programs identify selected formatting for program source code displayed in the editor. The one or more programs convert the most recent version of the program source code into a format editable in the editor and applying the identified formatting to the most recent version in the format generating a formatted most recent version. The one or more programs may also display the formatted most recent version, where the formatted most recent version is available in the editor for editing by a user of the client. In some embodiments of the present invention, the selected formatting for program source code displayed in the editor is selected from the group consisting of: custom formatting implemented by user entry in the graphical user interface of the editor and default formatting implemented automatically in the editor.

In some embodiments of the present invention, the first storage structure includes a canonical internal representation, and when the one or more programs transforms the modified version into a first storage structure, the one or more programs identify a programming language comprising the modified version and based on identifying the language, the one or more programs apply a language-specific tool to build the canonical internal representations.

In some embodiments of the present invention, when the one or more programs transform the modified version, the one or more programs identify one or more references in the modified version. The one or more programs also determine whether the one or more references should be preserved and based on determining that a portion of the one or more references should be preserved, the one or more programs access mapping tables generated as part of creating a build of the modified version and designating locations of the portion in first storage structure of the one or more references in the mapping tables.

In some embodiments of the present invention, the one or more programs also obtain from the client, via the communication connection over the network, a request to obtain a most recent version of the program source code from the repository. The one or more programs extract a set structure representing the most recent version from the repository, where the extracting comprises synthesizing the one or more differences in the repository and the second storage structure into the set structure representing the most recent version. The one or more programs identify selected formatting for program source code displayed in the editor. The one or more programs convert the most recent version of the program source code into a format editable in the editor and apply the identified formatting to the most recent version in the format generating a formatted most recent version, where the converting includes accesses the mapping tables to insert the portion into the formatted most recent version.

In some embodiments of the present invention, the one or more programs determine whether the one or more references should be preserved by identifying a programming language of the modified version.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more computing resources that comprise server(s) 203 can be understood as cloud computing node 10 (FIG. 5) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
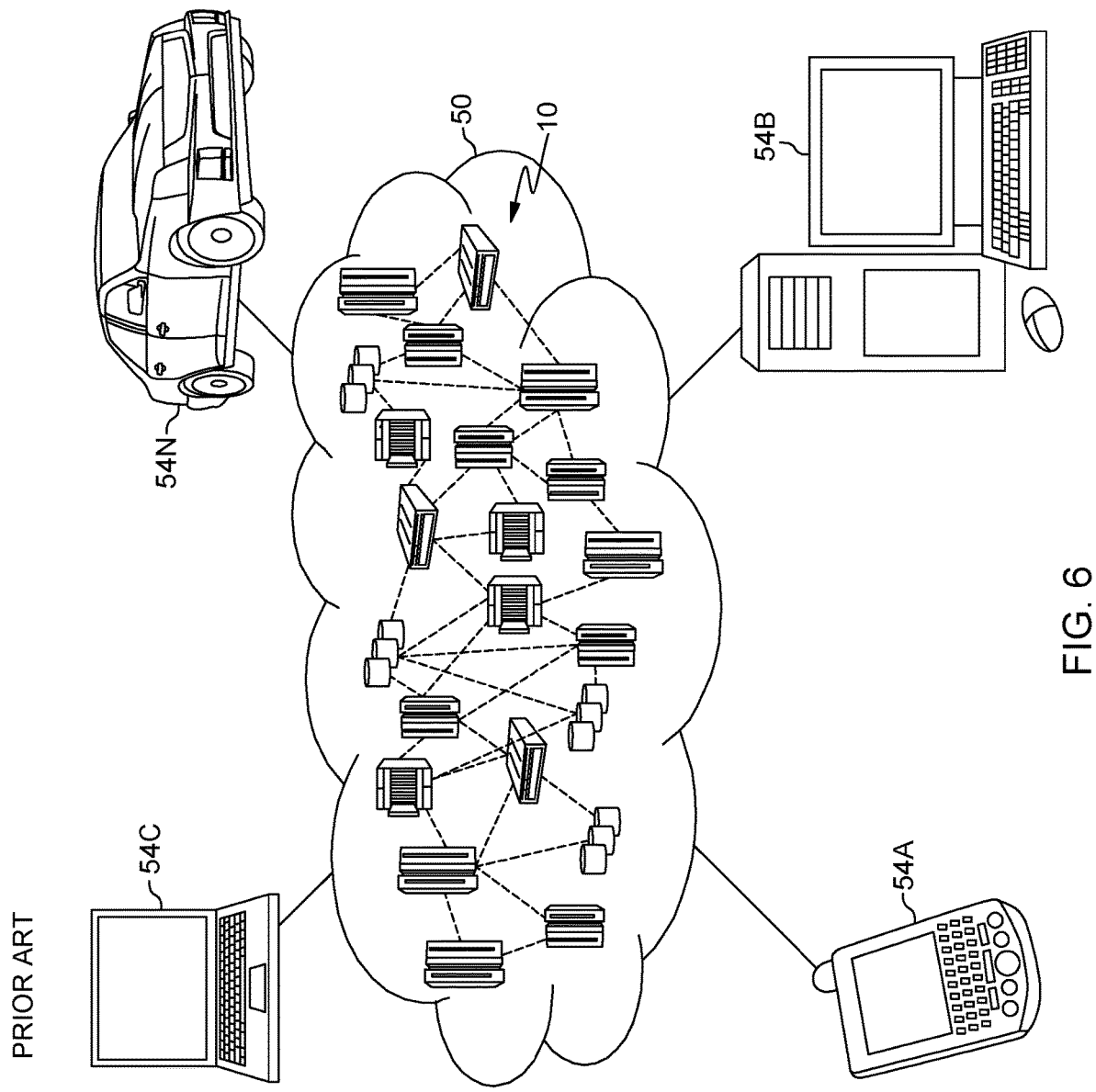
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
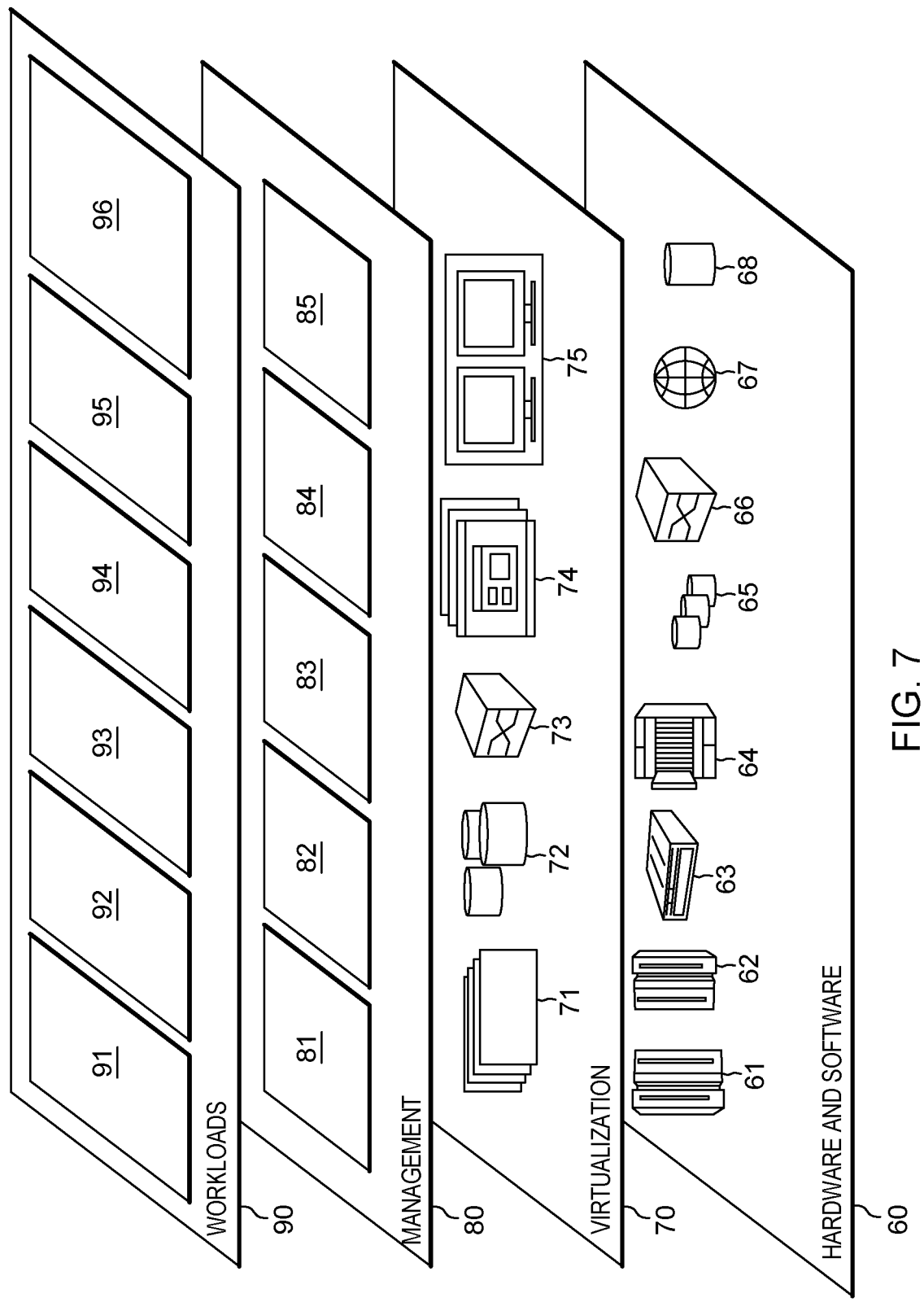
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing lossless bi-directional formatting of program source code 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    obtaining, by one or more processors of a host, from a client, via a communication connection over a network, a request to commit a modified version of program source code to a repository administered by the host;
    identifying, by the one or more processors, formatting in the modified version implemented by an editor executing on the client;
    removing, by the one or more processors, the identified formatting from the modified version;
    transforming, by the one or more processors, the modified version into a first storage structure comprising content of the modified version without the identified formatting, wherein the first storage structure comprises a canonical internal representation;
    identifying, by the one or more processors, one or more differences between the first storage structure representing the modified version and a second storage structure, wherein the second storage structure comprises an unmodified version of the program source code stored in the repository; and
    storing, by the one or more processors, the one or more differences in the repository.

2. The computer-implemented method of claim 1, wherein the unmodified version of the program source code comprises a last version of the program source code committed to the repository.

3. The computer-implemented method of claim 1, wherein identifying the formatting comprises:
    determining, by the one or more processors, if the formatting in the modified version implemented by an editor executing on the client comprises one of: custom formatting implemented by user entry in a graphical user interface of the editor or default formatting implemented automatically in the editor.

4. The computer-implemented method of claim 1, further comprising:
    obtaining, by the one or more processors, from the client, via the communication connection over the network, a request to obtain a most recent version of the program source code from the repository;
    extracting, by the one or more processors, a set structure representing the most recent version from the repository, wherein the extracting comprises synthesizing the one or more differences in the repository and the second storage structure into the set structure representing the most recent version;
    identifying, by the one or more processors, selected formatting for program source code displayed in the editor; and
    converting, by the one or more processors, the most recent version of the program source code into a format editable in the editor and applying the identified formatting to the most recent version in the format generating a formatted most recent version.

5. The computer-implemented method of claim 4, further comprising:
    displaying, by the one or more programs, the formatted most recent version, wherein the formatted most recent version is available in the editor for editing by a user of the client.

6. The computer-implemented method of claim 4, wherein the selected formatting for program source code displayed in the editor is selected from the group consisting of: custom formatting implemented by user entry in the graphical user interface of the editor and default formatting implemented automatically in the editor.

7. The computer-implemented method of claim 1, wherein transforming the modified version into a first storage structure comprises:
    identifying, by the one or more processors, a programming language comprising the modified version; and
    based on identifying the language, applying, by the one or more processors, a language-specific tool to build the canonical internal representations, wherein the canonical internal representations comprise one or more abstract syntax tree.

8. The computer-implemented method of claim 1, wherein the transforming comprises:
    identifying, by the one or more processors, one or more references in the modified version;
    determining, by the one or more processors, whether the one or more references should be preserved; and
    based on determining that a portion of the one or more references should be preserved, accessing, by the one or more processors, mapping tables generated as part of creating a build of the modified version and designating locations of the portion in first storage structure of the one or more references in the mapping tables, wherein the mapping tables preserve mappings between line numbers in the program source code and nodes in one or more abstract syntax tree comprising the canonical internal representations.

9. The computer-implemented method of claim 8, further comprising:
    obtaining, by the one or more processors, from the client, via the communication connection over the network, a request to obtain a most recent version of the program source code from the repository;
    extracting, by the one or more processors, a set structure representing the most recent version from the repository, wherein the extracting comprises synthesizing the one or more differences in the repository and the second storage structure into the set structure representing the most recent version;
    identifying, by the one or more processors, selected formatting for program source code displayed in the editor; and
    converting, by the one or more processors, the most recent version of the program source code into a format editable in the editor and applying the identified formatting to the most recent version in the format generating a formatted most recent version, wherein the converting comprises accesses the mapping tables to insert the portion into the formatted most recent version.

10. The computer-implemented method of claim 8, determining, by the one or more processors, whether the one or more references should be preserved comprises identifying a programming language of the modified version.

11. A computer program product comprising:
a computer readable storage medium readable by one or more processors and storing instructions for execution by the one or more processors for performing a method comprising:
obtaining, by the one or more processors of a host, from a client, via a communication connection over a network, a request to commit a modified version of program source code to a repository administered by the host;
identifying, by the one or more processors, formatting in the modified version implemented by an editor executing on the client;
removing, by the one or more processors, the identified formatting from the modified version;
transforming, by the one or more processors, the modified version into a first storage structure comprising content of the modified version without the identified formatting, wherein the first storage structure comprises a canonical internal representation;
identifying, by the one or more processors, one or more differences between the first storage structure representing the modified version and a second storage structure, wherein the second storage structure comprises an unmodified version of the program source code stored in the repository; and
storing, by the one or more processors, the one or more differences in the repository.

12. The computer program product of claim 11, wherein the unmodified version of the program source code comprises a last version of the program source code committed to the repository.

13. The computer program product of claim 11, wherein identifying the formatting comprises:
determining, by the one or more processors, if the formatting in the modified version implemented by an editor executing on the client comprises one of: custom formatting implemented by user entry in a graphical user interface of the editor or default formatting implemented automatically in the editor.

14. The computer program product of claim 11, the method further comprising:
obtaining, by the one or more processors, from the client, via the communication connection over the network, a request to obtain a most recent version of the program source code from the repository;
extracting, by the one or more processors, a set structure representing the most recent version from the repository, wherein the extracting comprises synthesizing the one or more differences in the repository and the second storage structure into the set structure representing the most recent version;
identifying, by the one or more processors, selected formatting for program source code displayed in the editor; and
converting, by the one or more processors, the most recent version of the program source code into a format editable in the editor and applying the identified formatting to the most recent version in the format generating a formatted most recent version.

15. The computer program product of claim 14, the method further comprising:
displaying, by the one or more programs, the formatted most recent version, wherein the formatted most recent version is available in the editor for editing by a user of the client.

16. The computer program product of claim 14, wherein the selected formatting for program source code displayed in the editor is selected from the group consisting of: custom formatting implemented by user entry in the graphical user interface of the editor and default formatting implemented automatically in the editor.

17. The computer program product of claim 11, wherein transforming the modified version into a first storage structure comprises:
identifying, by the one or more processors, a programming language comprising the modified version; and
based on identifying the language, applying, by the one or more processors, a language-specific tool to build the canonical internal representations, wherein the canonical internal representations comprise one or more abstract syntax tree.

18. The computer program product of claim 11, wherein the transforming comprises:
identifying, by the one or more processors, one or more references in the modified version;
determining, by the one or more processors, whether the one or more references should be preserved; and
based on determining that a portion of the one or more references should be preserved, accessing, by the one or more processors, mapping tables generated as part of creating a build of the modified version and designating locations of the portion in first storage structure of the one or more references in the mapping tables.

19. The computer program product of claim 18, the method further comprising:
obtaining, by the one or more processors, from the client, via the communication connection over the network, a request to obtain a most recent version of the program source code from the repository;
extracting, by the one or more processors, a set structure representing the most recent version from the repository, wherein the extracting comprises synthesizing the one or more differences in the repository and the second storage structure into the set structure representing the most recent version;
identifying, by the one or more processors, selected formatting for program source code displayed in the editor; and
converting, by the one or more processors, the most recent version of the program source code into a format editable in the editor and applying the identified formatting to the most recent version in the format generating a formatted most recent version, wherein the converting comprises accesses the mapping tables to insert the portion into the formatted most recent version.

20. A system comprising:
a memory;
one or more processors in communication with the memory; and
program instructions executable by the one or more processors via the memory to perform a method, the method comprising:
obtaining, by the one or more processors of a host, from a client, via a communication connection over a network, a request to commit a modified version of program source code to a repository administered by the host;

identifying, by the one or more processors, formatting in the modified version implemented by an editor executing on the client;

removing, by the one or more processors, the identified formatting from the modified version;

transforming, by the one or more processors, the modified version into a first storage structure comprising content of the modified version without the identified formatting, wherein the first storage structure comprises a canonical internal representation;

identifying, by the one or more processors, one or more differences between the first storage structure representing the modified version and a second storage structure, wherein the second storage structure comprises an unmodified version of the program source code stored in the repository; and storing, by the one or more processors, the one or more differences in the repository.

\* \* \* \* \*